United States Patent [19]
Dreano

[11] Patent Number: 5,921,171
[45] Date of Patent: Jul. 13, 1999

[54] PRESSING DEVICE FOR MOLDING AND COOKING PRODUCTS

[75] Inventor: Claude Dreano, Mauron, France

[73] Assignee: Armor Inox SA, Mauron, France

[21] Appl. No.: 09/042,933

[22] Filed: Mar. 17, 1998

[30]  Foreign Application Priority Data

Mar. 27, 1997 [FR] France ................................. 97 04029
Nov. 26, 1997 [FR] France ................................. 97 15120

[51] Int. Cl.[6] ............................... A22C 7/00; B30B 7/02
[52] U.S. Cl. ............................. 99/351; 99/349; 99/353; 99/432; 100/194; 100/265; 100/910; 249/82; 249/167
[58] Field of Search ............................. 99/330, 349–351, 99/352–355, 369, 371, 379, 432, 423; 100/194, 910, 265, 266, 295, 268, 344, 325, 219; 414/766; 425/338; 426/506, 407, 418, 519, 512, 523, 513; 452/174, 185; 249/82, 117, 121, 167

[56]  References Cited

U.S. PATENT DOCUMENTS 3,750,563  8/1973  Tonjum ................................. 100/194

FOREIGN PATENT DOCUMENTS 0 625 325 A1  11/1994  European Pat. Off. .
0 638 270 A1  2/1995  European Pat. Off. .

*Primary Examiner*—Timothy F. Simone
*Attorney, Agent, or Firm*—Laff, Whitesel, Conte & Saret, Ltd.

[57]  ABSTRACT

A pressing device comprised of stackable moulds for cooking and shaping hams into an oval cross-section. Each mould comprises transverse sides, longitudinal sides, crosspieces extending between the longitudinal sides, and a plurality of fixed troughs extending between the transverse sides. Below each trough (3), there is suspended from the transverse sides, a cover which is formed by a longitudinal plate, two end plates and two longitudinal sides. The end plates of the cover can slide against the faces of the transverse sides, each end plate being furnished with longitudinal pins which are directed toward vertical slots positioned along the transverse sides. Finally, a spring is disposed and compressed between the cover and the base of the trough.

11 Claims, 6 Drawing Sheets

PRESSING DEVICE FOR MOLDING AND COOKING PRODUCTS

FIELD OF INVENTION

The present invention concerns a pressing device comprised of stackable receptacles and in particular, a pressing device which contains and moulds food products, such as hams, during cooking.

BACKGROUND

In the past, to make moulded hams, moulds were used which were filled with pieces of meat, dried, pressed and then finally cooked. These moulds have been modernized by making them into the shape of relatively long troughs, assembling these troughs parallel to one another in rigid frames (which generally require the use of forklifts for handling), stacking these frames to form blocks, placing the blocks into enclosed areas, and then cooking and cooling the meat by circulating a heat transfer fluid for the cooking and a coolant fluid for cooling. The cooking operation ends when the block is removed from the enclosed area, unstacked and the hams removed from the moulds.

To press the ham into the troughs, the bases thereof are connected to covers and spring systems which are used to press the ham contents into the troughs situated immediately below them in the stack.

European patents BP-A-0 292 417 and BP-A-0 638 270 concern stackable moulds of the aforementioned type. In BP-A-0 292 417, a stackable set of moulds is described (see FIGS. 4 and 5), in which each of the troughs has a rectangular cross-section. Plates suspended under their flat bases serve as covers for the troughs of the moulds immediately below them in the stack. The size of the plates is slightly less than the inside cross-section of the troughs. As well, the vertical distance between a cover and the base of the overhead trough is fixed. At the start of cooking the covers penetrate less into the lower troughs than shown (see FIGS. 4 and 5), During cooking, the covers penetrate further due to the pressure resulting from the weight of the block and tensioning means mounted on the outside of the moulds between horizontal bars used for handling the moulds.

In EP-A-0 638 270, a set of stackable moulds is described in which each of the bases of the troughs press downwardly from above onto the hams contained in the troughs of the mould immediately below the pressing mold in the stack. Moreover, in each trough, a false movable base is provided, above its base, on which the lower part of the ham to be cooked rests. Between the actual base and the false base, elastic means are provided which push the false base upward. Thus, during cooking, the ham is pressed between the actual base of the upper trough and the false base of the lower trough using the weight of the stack, the tensioning means and the elastic means.

The means provided in the above mentioned patents focus on troughs having a rectangular cross-section for moulding hams with a rectangular cross-section. They work well because small movements of the trough do not result in undesirable jammings. Additionally, the elastic means provided in the second patent allows the ham to be pressed during cooking, which translates into a better quality food product.

The moulding and cooking of hams using troughs with a cylindrical cross-section has also been considered in BP-A-0 638 270, noted above (see FIG. 5). The false base, instead of being flat, has the shape of the base of a trough, concave toward the top, with longitudinal sides which drop and ensure a guide within the trough. However, this guiding may not be reliable, for example, if a piece of ham becomes unexpectedly lodged between a longitudinal aide and the lateral wall of the trough.

SUMMARY OF THE INVENTION

It is therefore, one object of the present invention to provide an improved stackable receptacle for moulding and cooking of food products, such as hams, which comprises a frame furnished with longitudinal troughs which are cylindrical in shape and means fastened to each trough to enhance the pressing aspect and ultimately the quality of food product produced by the device.

Another object of the present invention is focused on providing improved guides for the components of the device which move vertically during cooking.

According to one embodiment of the invention, each mould comprises a frame with transverse sides, longitudinal sides and a plurality of fixed troughs extending between the transverse sides, the sides being vertical metal plates. Each each trough has suspended from its transverse sides, a cover which includes a longitudinal plate, two vertical end plates and two longitudinal edge. The vertical end plates of the cover can slide against and engage the face of the transverse sides. Each vertical end plate has pins which are directed toward and engage vertical slots positioned at regular intervals along the transverse sides. Finally, a spring is disposed and compressed between the cover and the base of the trough.

Conveniently, the longitudinal plate integral to each cover is slightly shorter than the distance between the transverse sides so that the vertical end plates of the cover slide against the inside faces of the transverse sides with the pins being directed outwardly toward the vertical slots of the transverse sides. Alternately, the longitudinal plate is slightly longer than the distance between the transverse sides and the vertical end plates of the cover are allowed to slide on the outside of the transverse sides with the pins being directed inwardly toward the vertical slots of the transverse sides.

According to another feature, the spring is in the form of a leaf spring plate. The leaf spring plate may take an undulating shape such as a sinusoid comprising several waves.

According to another feature, crosspieces extending between the longitudinal sides are made in one piece to conform to the longitudinal sides of the frame and the bases of the troughs. The lower sides of the crosspieces have an indentation opposite each trough which allows the leaf spring plate to rest against the base of the trough, with the position of the peaks of the undulating leaf spring plate corresponding to the position of the crosspieces. Additionally, the lower side of each crosspiece is furnished with short longitudinal plates which form lateral guides and centering means for the peaks of the undulating or sinusoidal leaf spring plate.

According to another feature, at the location where each valley of the sinusoidal leaf spring plate rests on the longitudinal plate of the cover, there is provided lateral guides and centering means for the spring plate, consisting of two short vertical plates positioned on opposite sides of the spring plate.

According to another feature, the spring is in the form of a helical compression spring with lower and upper ends, the lower end resting on the upper side of the cover and the upper end resting against the base of the trough.

According to another feature, stops are mounted on the upper side of the cover in such a way that they define, between them, a space which the lower end of the compression spring can circumscribe.

BRIEF DESCRIPTION OF THE DRAWINGS

The aforementioned features of the present invention, as well as others, shall become clearer on reading the following description of an embodiment of the Invention, the description being given in association with the attached drawings, where.

DESCRIPTION OF THE PREFERRED EMBODIMENT

In the following description, it should always be kept in mind that the object of the invention concerns stackable sets of moulds.

Figure 1:
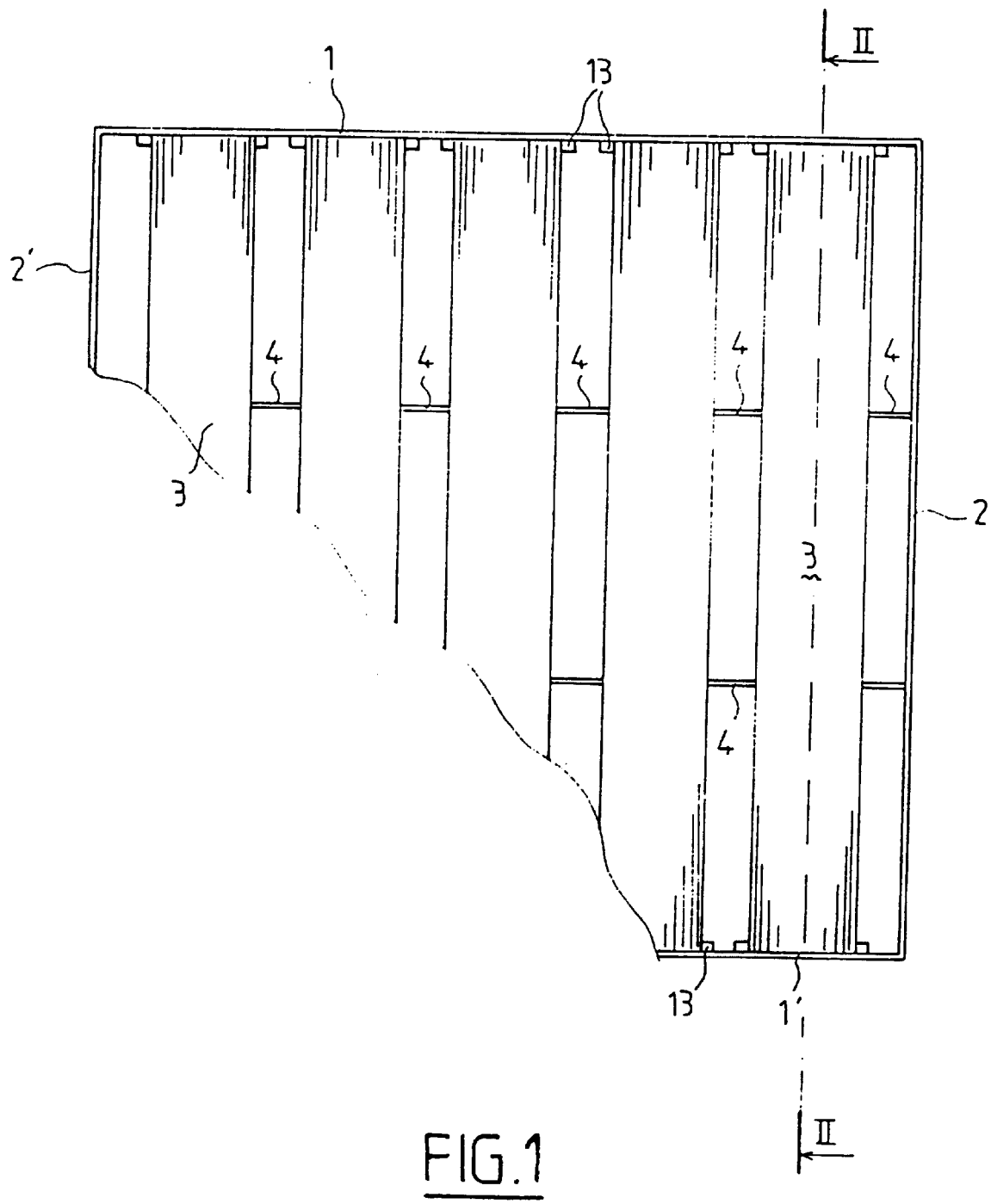
FIG. 1 is a partial top view of a mould according to the invention.

The rectangular mould, shown partially in FIG. 1, comprises two transverse sides 1, 1', and two longitudinal sides 2, 2', each side formed by a metal plate. Between the transverse sides 1, 1', several troughs 3, which are to contain the ham, are arranged so that their ends are fixed to sides 1, 1'. It will be assumed in the following description that the bases of these troughs 3 are transversely concave in order to form hams with oval-shaped crossections, but it should be understood that the invention also applies to troughs which have almost flat bases.

Figure 2:
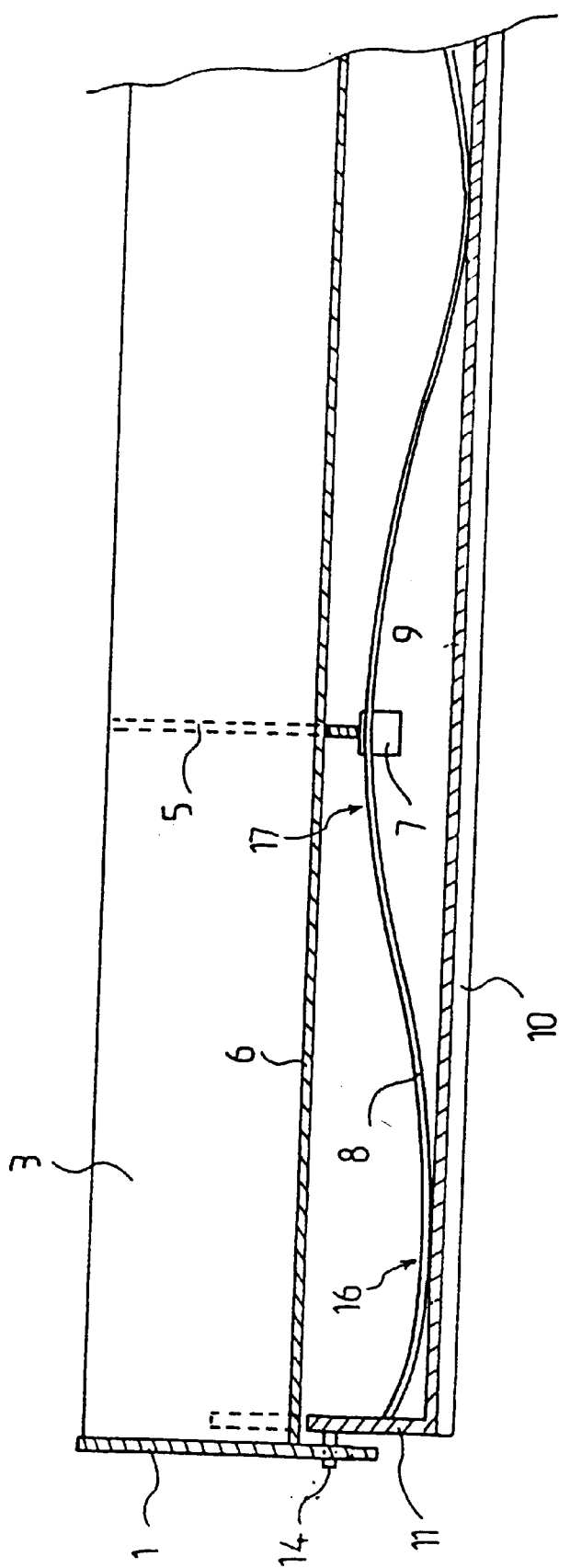
FIG. 2 is a partial longitudinal sectional view of a lateral trough contained in a mould, along the line II—II of FIG. 1.
Figure 5:
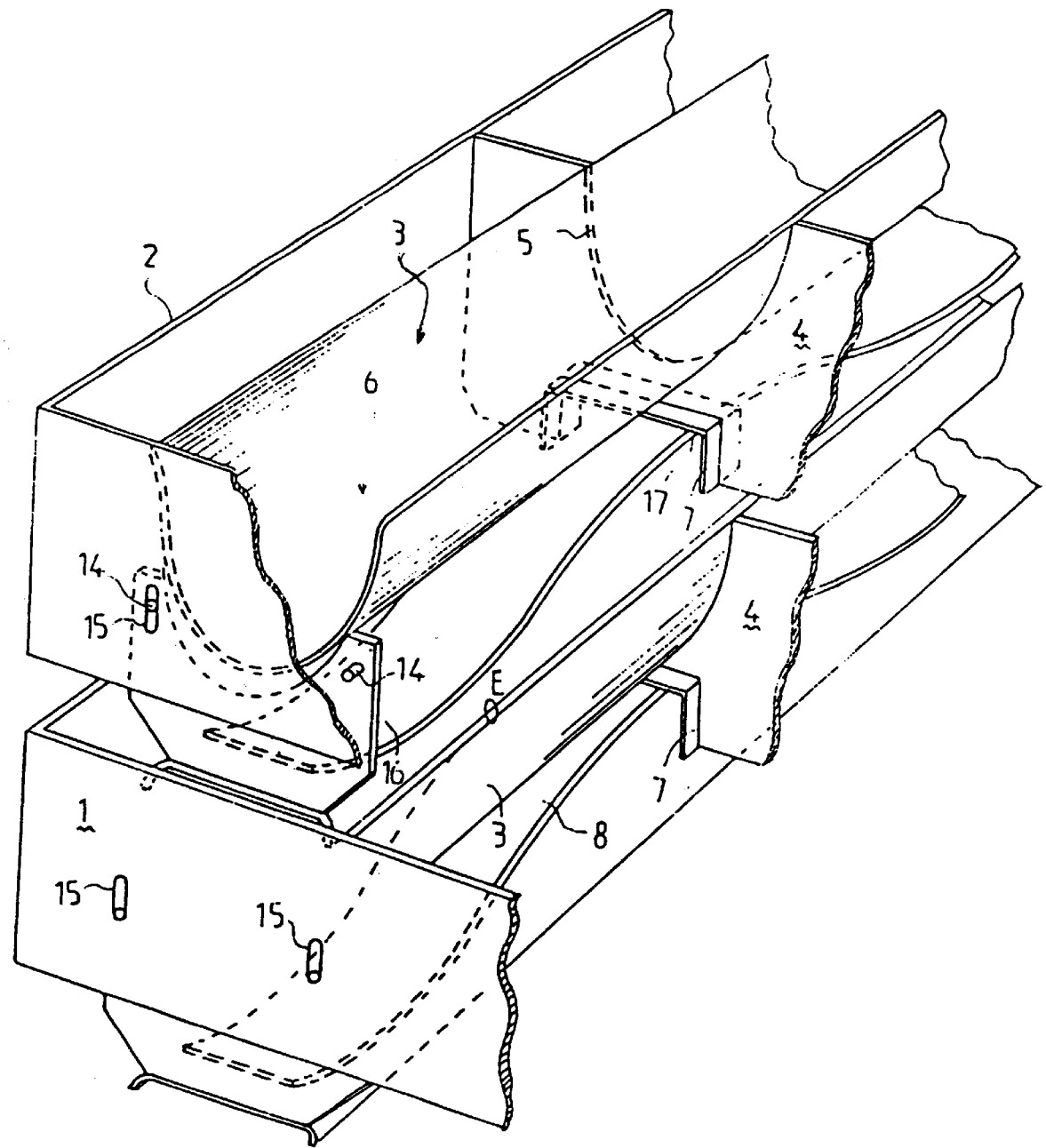
FIG. 5 is a partial perspective view of two stacked moulds according to the invention.
Figure 7:
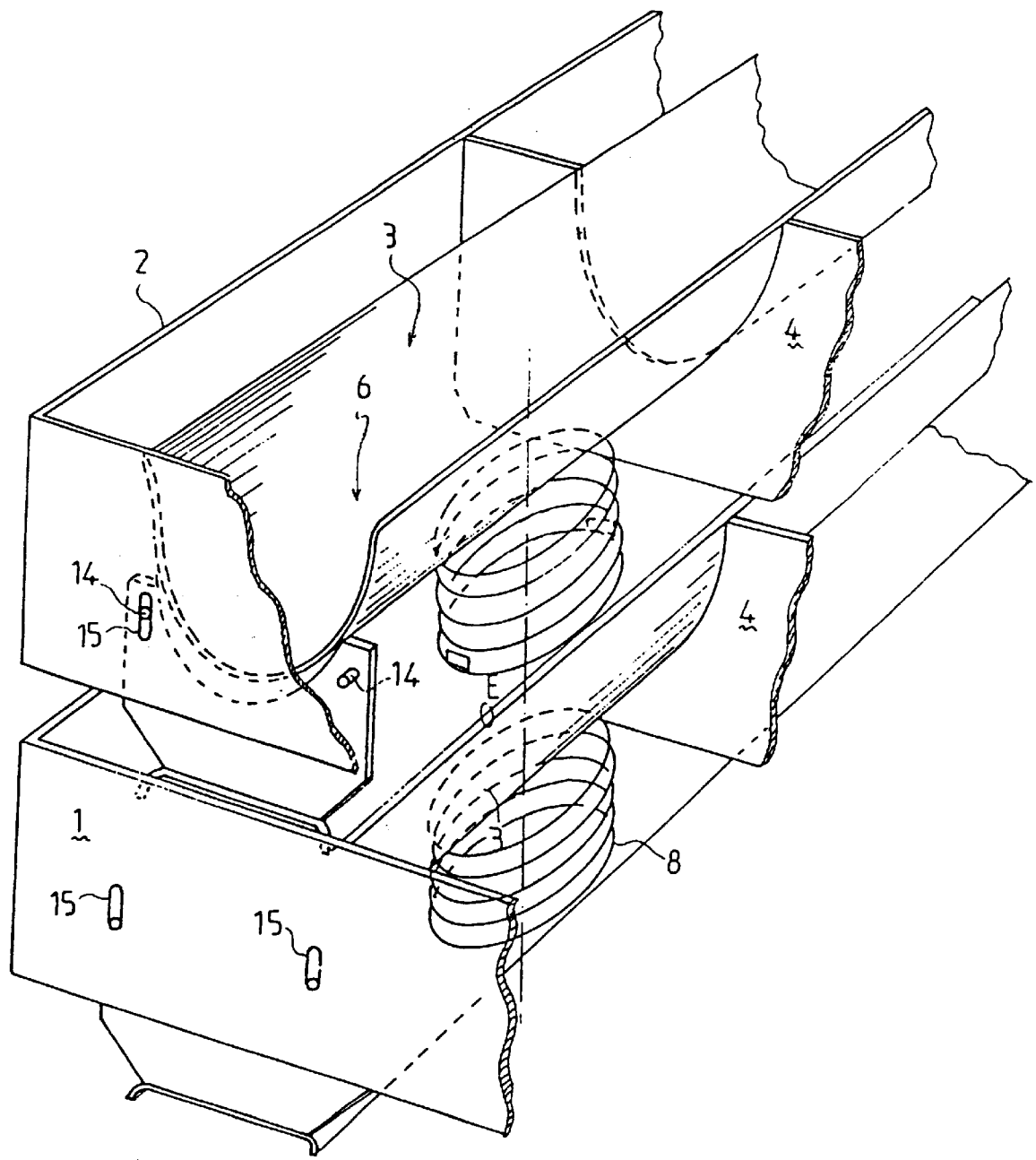
FIG. 7 is a partial perspective view of two stacked moulds according to the second embodiment of the invention.

As shown in FIGS. 1 and 2, as well as in FIGS. 5 and 7, crosspieces 4 are provided so as to be fixed at regular distances along longitudinal sides 2, 2', each crosspiece is formed by a metal plate, the upper sides of which have indentations 5 which join the bases 6 of the troughs 3 and which are attached to the bases 6.

As can be seen in FIG. 2, below the lowest level of a trough 3, there is provided, between the sides 1, 1' of the mould, without being joined to it, a cover 9 which serves as a cover for the corresponding trough of the mould immediately below in a stack. The longitudinal edges 10 of the cover 9 are, preferably, slightly turned down, the width of the entire cover 9 being slightly less than the inside width of the upper opening of a trough 3, as can be seen at E in FIG. 5.

Figure 3:
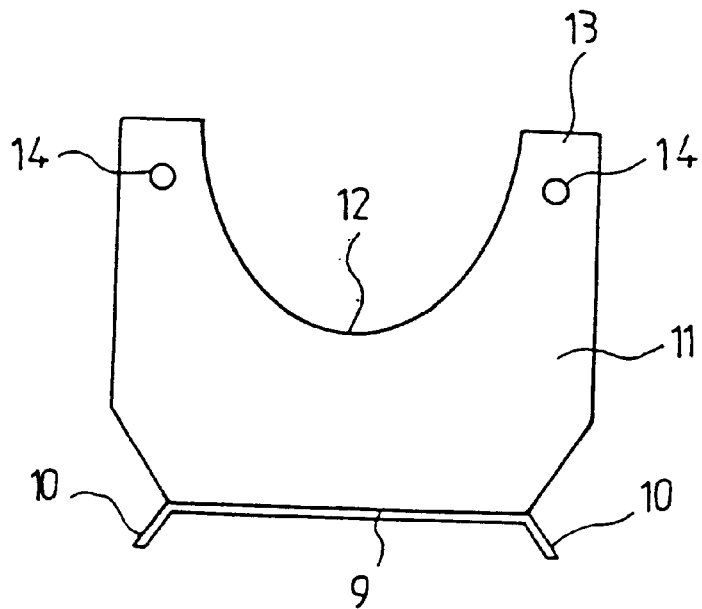
FIG. 3 is a front view of a cover, shown prior to being suspended from the transverse sides.

In FIG. 3, cover 9 has a length which is less than the space between the transverse sides 1, 1'. A cover 9 is shown to which a small vertical end plate 11 is soldered at right angles thereto. The upper edge of end plate 11 contains an indentation 12, similar to the cross-section of the base of a trough 3. Each vertical end plate 11 comprises, on each side of the indentation 12, two upward projections 13 which are disposed vertically and which each have a small horizontal pin 14, protruding outwardly therefrom. The indentation 12 and the base 6 of trough 3 have a similar shape but are not joined.

Figure 4:
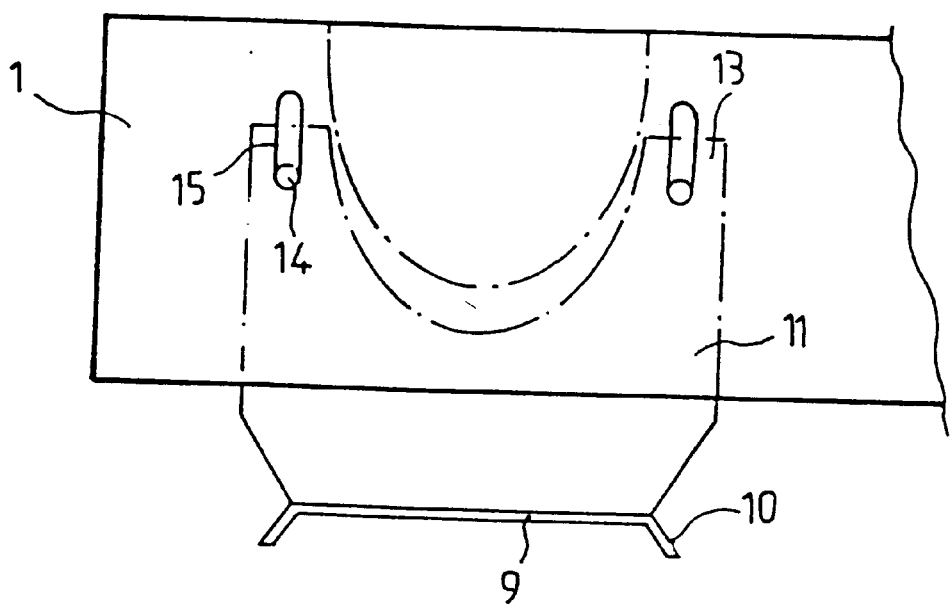
FIG. 4 is a front view of a transverse side of the mould of FIG. 1, showing how the covers are suspended from the transverse sides.

FIG. 4 shows that the transverse side 1 of the mould includes vertical slots 15, each of which is to receive a pin 14 extending from vertical end plate 11 attached to cover 9. Each pin 14 is sufficiently long to extend through the metal plate of a transverse side without forming any external protrusions. Thus, the slots 15 are used as a vertical guide for the pins 14. Another, identical, vertical end plate 11 is also provided at the other end of the cover 9, the pins 14 of which enter into the slots 15 of transverse side 1'. The view of FIG. 4 also shows, in dash-dotted lines showing the relative positions of trough 3 and cover 9 when cover 9 is in position.

The vertical movement of cover 9 is independent of that of the transverse sides 1, 1', although they are limited by the upper and lower ends of the vertical slots 15 which guide the movement of pins 14. In a preferred embodiment, a leaf spring 8 (FIGS. 2,5 ) is provided between the base 6 of a trough 3 and the cover 9 to accommodate such movement while firmly positioning cover 9 on the trough 3 positioned below in the stack.

In a first embodiment (FIG. 2), the spring 8 consists of a plate which has, in the longitudinal direction, a sinusoidal shape with valleys 16 which rest on the upper side of the cover 9 and with peaks 17 which are respectively lodged in the wide rectangular indentations 7 of the lower sides of the crosspieces 4. These indentations 7 are, for example, furnished with short metal plates which are attached at right angles thereto in a longitudinal direction. Indentations 7 guide, without being fixed, the leaf spring plate 8. Moreover, the spring plate 8 is always kept compressed between the cover 9 and the indentations 7. When the leaf spring 8 is compressed, the valleys 16 slide freely on the cover 9 while the peaks 17 are laterally guided by the indentations 7.

The perspective view of FIG. 5, shows two moulds which are stacked. This figure illustrates the relative positions of the troughs 3, cover 9, leaf spring plates 8 and crosspieces 4, which make it possible to compress and mould the ham during cooking in an enclosed space in which a heat transfer fluid circulates, as noted above in the background discussion.

At the start, prior to the stacking stage, in each single mould, the troughs 3 are filled with uncooked ham and are covered by covers 9. The pins 14 occupy a lower position in the vertical slots 15 due to the forces of the leaf spring plates 8 acting downwardly on the covers 9. The leaf spring plate 8 remains under tension because the lower parts of the vertical slots 15 form abutments. When the moulds are stacked, the weight of the full troughs 3 press down on the spring plate 8 through the indentations 7 of the crosspieces 4, which compresses the leaf spring plates 8. These forces combined with those generated by the tensioning means push cover 9 onto trough 3. The mould has a tendency to drop with respect to cover 9 as the pins 14 assume intermediary positions in the vertical slots 15. It should be noted that the indentation 12 of the vertical end plate 11 generally serves as an abutment for the corresponding end of a trough 3, which is attached to the transverse side 1 or 1'. As already mentioned, the indentation 12 has a shape similar to that of the cross-section of the base 6 of the trough 3.

In FIG. 2, the leaf spring plate 8 was shown with a valley 16 close to the vertical end plate 11 and a peak 17 under an indentation 7 of a crosspiece 4. The positions of the valleys and peaks can be interchanged without leaving the scope of the invention, simply by reversing the leaf spring plate 8.

It will be noted that the spring plate 8 and the guide means for it in the indentation 7 are not subject to jamming with meat scraps. Also, the washing of each cover 9 is easily managed.

Figure 6:
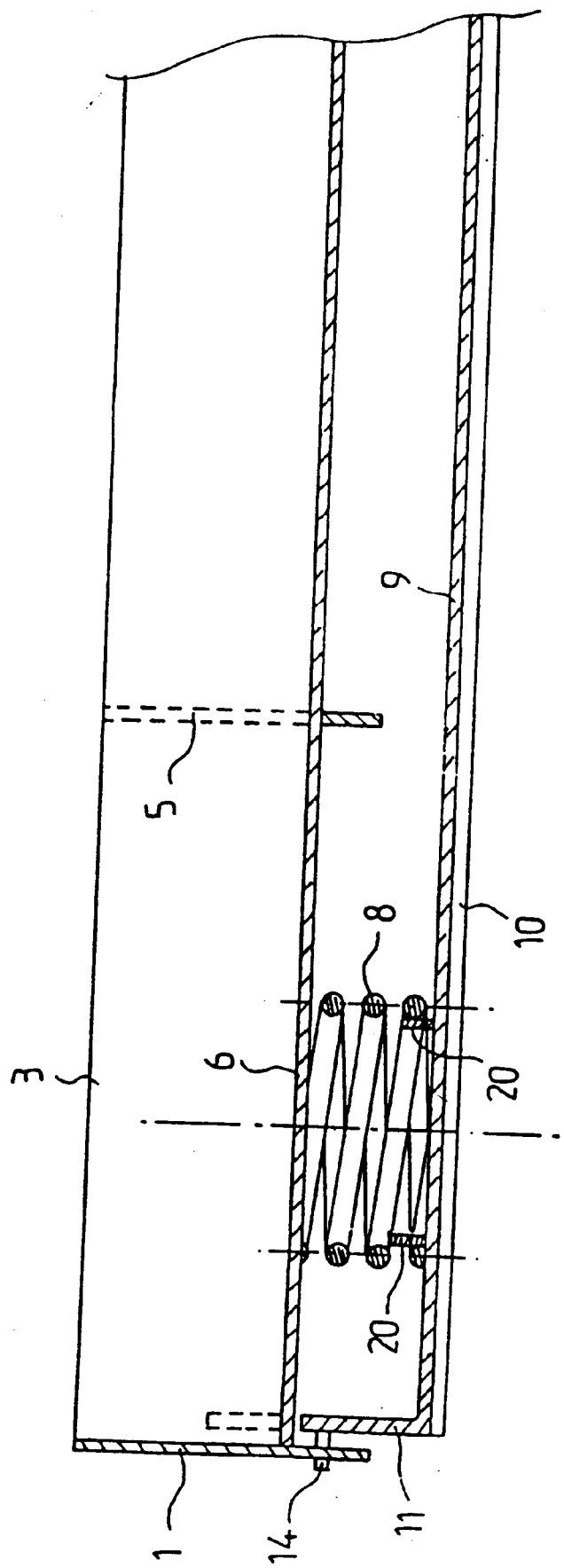
FIG. 6 is a partial longitudinal sectional view of a lateral trough of a mould, also along the line II/II of FIG. 1, a helical spring being mounted in accordance with a second embodiment of the invention.

Another embodiment of the invention is shown in FIGS. 6 and 7. According to this embodiment the spring 8 is no longer a spring plate but a helical compression leaf spring 8. Note that, in FIGS. 6 and 7, the same items as those shown in FIGS. 2 and 5 bear the same reference numbers respectively.

As can be seen in FIGS. 6 and 7, a helical compression spring 8 is mounted close to each transverse side 1 and 1' of the troughs 3. Each helical spring 8 has its longitudinal axis perpendicular to the longitudinal axis of the trough 3 and rests, with its lower end, on the upper side of the cover 9 and is supported, with its upper end, on the base 6 of the trough 3.

It will be noted that, au in the preceding embodiment, each helical spring 8 is compressed when stacking is initiated. To prevent it from sliding on the upper side of the cover 9, stops 20 are mounted directly on the upper side of cover 9 in such a way that they define, between them, a space in which the lower end of the helical spring 8 can be bound. For example, a pair of stops 20 are spaced apart by a distance equal to the inside diameter of the end of the helical spring 8. Moreover, the axis which joins these two stops is parallel to that of the trough 3.

It will be noted that, in this embodiment, the crosspieces 4 do not have indentations as in the preceding embodiment. Their lower edge extends along the base of trough 3.

The functioning of this embodiment is almost the same as that of the preceding embodiment and shall therefore not be described again.

Moreover, it will be understood that by these two embodiments that the invention encompasses any means likely to exert a force between the base of the trough 3 and the upper side of the cover 9.

It will also be noted that, in the two embodiments shown, that the length of the cover 9 may be slightly greater than the distance between the transverse sides 1, 1', the vertical end plates 11 being situated outside of transverse sides 1, 1' and the pins 14 being turned inwardly. In this case, it is not necessary to provide an indentation 12.

Also, in another variation, the lateral guide means of the leaf spring plate 8 may be provided for the valleys 16 (FIG. 2) on the upper side of cover 9, instead of being situated under an indentation 7 of a crosspiece 4. The guide means may thus be, in each case, formed by two short vertical plates, attached to the upper side of cover 9, thereby framing a valley 16.

The embodiments of the invention in which an exclusive property or privilege are claimed are as follows:

1. A food pressing and cooking device for moulding food, said device comprising:
    a plurality of stackable molds made of metal, each of said moulds having a pair of transverse sides with a face surface having at least one vertical slot therein; and a pair of spaced parallel, longitudinal sides, joining said transverse sides,
    a plurality of troughs extending between and supported by said transverse sides;
    each of said troughs having a base;
    a cover for each of said moulds, each of said covers having longitudinal plate, two vertical end plates, and two longitudinal edges;
    each of said covers being suspended from the transverse sides and below a corresponding one of said troughs;
    each of said vertical end plates of said cover being positional to slide against a face of said transverse side;
    at least one pin extending from each of said vertical end plate, projecting toward said transverse side, and through said vertical slot; and
    spring means disposed and compressed between the cover and the base of said trough.

2. The device of claim 1 wherein said transverse sides are separated by a predetermined distance, and said longitudinal plate of said cover has a length which is less than said predetermined distance, said vertical end plates sliding along between the inside surfaces of said transverse sides, the pins extending outwardly toward and into said vertical slots.

3. The device of claim 1 wherein said transverse sides are separated by a predetermined distance, and said longitudinal plate of said cover has a length which is greater than said predetermined distance, said vertical plates sliding along the outside surfaces of said transverse sides, and the pins extending inwardly toward and into the vertical slots.

4. The device according to claim 1 wherein the spring means is a leaf spring plate.

5. The device of claim 4 wherein the leaf spring has an undulating shape.

6. The device of claim 5 and crosspieces extending between said longitudinal sides of said mould and connecting the longitudinal sides with the bases of said troughs, and an indentation formed on a lower side of each of said crosspieces, said indentions being opposite said troughs, and said spring means resting on the base of the trough and being controlled by said indention.

7. The device of claim 6 wherein the undulating shape has several wave forms with peaks corresponding to the respective crosspieces.

8. The device of claim 7 wherein each of said indentions has an associated short longitudinal plate, said indentations forming lateral guides and centering means associated with the peaks of said leaf spring.

9. The device of claim 7 further comprising lateral guide and centering means associated with valleys of the leaf spring, said guide and centering means comprising two short vertical plates on an upper side of said cover, said two vertical plates being located adjacent opposite sides of said leaf spring.

10. The device according to claim 1 wherein the spring means is a helical compression spring having lower and upper ends, said lower end resting on the upper side of the cover and the upper end resting against the base of said trough.

11. The device of claim 10 and stop means mounted on the upper side of the cover to fix the position of the lower end of said helical spring.

* * * * *